US010848495B2

(12) United States Patent
Kale et al.

(10) Patent No.: US 10,848,495 B2
(45) Date of Patent: Nov. 24, 2020

(54) INTERNET OF THINGS SECURITY SYSTEM

(71) Applicant: Cisco Technology, Inc., San Jose, CA (US)

(72) Inventors: Nikhil Sainath Kale, Santa Clara, CA (US); M. David Hanes, Lewisville, NC (US); Ana Peric, Hallbergmoos (DE); Gonzalo Salgueiro, Raleigh, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 251 days.

(21) Appl. No.: 15/898,590

(22) Filed: Feb. 18, 2018

(65) Prior Publication Data

US 2019/0260751 A1    Aug. 22, 2019

(51) Int. Cl.
*H04L 29/06* (2006.01)
*G06F 21/60* (2013.01)
(Continued)

(52) U.S. Cl.
CPC ............ *H04L 63/102* (2013.01); *G06F 21/46* (2013.01); *G06F 21/604* (2013.01);
(Continued)

(58) Field of Classification Search
CPC ..... H04L 63/101; H04L 63/102; H04L 63/20; H04L 63/0876; H04L 63/083; G06F 21/44; G06F 21/46; G06F 21/604
See application file for complete search history.

(56) References Cited

U.S. PATENT DOCUMENTS 8,849,978 B1 * 9/2014 Batson ................... H04L 67/10
709/223
9,535,676 B1 * 1/2017 Forehand ................. G06F 8/61
(Continued)

FOREIGN PATENT DOCUMENTS

JP    2016192126    11/2016
JP    2016201032    12/2016
(Continued)

OTHER PUBLICATIONS

Aris, Ahmet et al.; Internet-of-Things Security: Denial of Service Attacks (2015).
(Continued)

*Primary Examiner* — Ali S Abyaneh
*Assistant Examiner* — Chu Chun Gao

(57) ABSTRACT

In one embodiment, a device including a processor, and a memory to store data used by the processor, wherein the processor is operative to run a manufacturer usage description (MUD) controller operative to obtain a MUD profile of an Internet of Things (IoT) device from a MUD server, the MUD profile of the IoT device including: access rights of the IoT device, and any one or more of the following a default device username and/or a default device password of the IoT device, a recommended/required device password complexity of the IoT device, at least one service that should be enabled/disabled on the IoT device, and/or allowed security protocols and/or ciphers for communication to and/or from the IoT device, enforce security of the IoT device according to the MUD profile of the IoT device. Related apparatus and methods are also described.

20 Claims, 4 Drawing Sheets

(51) Int. Cl.
*G06F 21/46* (2013.01)
*G06F 21/44* (2013.01)

(52) U.S. Cl.
CPC ........ *H04L 63/083* (2013.01); *H04L 63/0876* (2013.01); *H04L 63/101* (2013.01); *G06F 21/44* (2013.01); *H04L 63/20* (2013.01)

(56) References Cited

U.S. PATENT DOCUMENTS

| | | | |
|---|---|---|---|
| 10,122,577 B1* | 11/2018 | Rykowski | ............ H04L 41/0806 |
| 2007/0143824 A1* | 6/2007 | Shahbazi | ............... H04L 63/083 |
| | | | 726/1 |
| 2014/0214610 A1 | 7/2014 | Moshir | |
| 2016/0301707 A1* | 10/2016 | Cheng | ................. H04L 63/1425 |
| 2016/0364163 A1 | 12/2016 | Kamble | |
| 2017/0034700 A1 | 2/2017 | Cohen et al. | |
| 2017/0099176 A1 | 4/2017 | Jain | |
| 2017/0195294 A1 | 7/2017 | Branca | |
| 2018/0144139 A1* | 5/2018 | Cheng | ................... G06F 21/577 |
| 2018/0316563 A1* | 11/2018 | Kumar | ................ H04L 41/5051 |
| 2019/0058713 A1* | 2/2019 | Pala | ...................... H04L 63/105 |
| 2019/0089747 A1* | 3/2019 | Wang | .................... H04L 9/0841 |
| 2019/0098028 A1* | 3/2019 | Ektare | .................... H04L 43/10 |
| 2019/0253319 A1* | 8/2019 | Kampanakis | .......... G06N 20/00 |
| 2020/0145409 A1* | 5/2020 | Pochuev | ................. H04W 4/70 |

FOREIGN PATENT DOCUMENTS

| | | | | |
|---|---|---|---|---|
| KR | 2017103318 | | 9/2017 | |
| KR | 2017106871 | | 9/2017 | |
| KR | 20160025945 | * | 9/2017 | ........... H04L 63/101 |

OTHER PUBLICATIONS

Ballani, Hitesh eta l.; Mitigating DNS DOS Attacks (2008).
Dobbins, Roland et al.; Mirai Botnet Description and DDOS Attack Mitigation (Oct. 26, 2016).
European Union Agency for Network and Information Security, Major DDOS Attack Involving IOT Devices (Nov. 3, 2016).
Fadda, Khaled, DDOS Attacks and Rise of IOT Botnets (2017).
ForeScout Technologies, Inc.; Response to Request for Public Comment: Promoting Stakeholder Action Against Botnets and Other Automated Threats; (RIN 0660-XC03) National Telecommunications and Information Administration (NTIA); Jul. 28, 2017.
Gallagher, Sean; How One Rent-a-Botnet Army of Cameras, DVRS Caused Internet Chaos (Oct. 25, 2016).
Hallman, Roger et al.; IODDOS—the Internet of Distributed Denial of Service Attacks, (Apr. 2017).
Lear, E. et al.; Manufacturing Usage Description Specification (Oct. 24, 2017).
Lear, Eliot; Improving IOT Security: The Role of the Manufacturer (2017).
McAfee, Secure IOT Devices to Protect Against Attacks (2017).
NSFocus: The Rise of IOT Malware and How to Defend Against It (2017).
Polk, Tim et al.; Mitigating IOT-Based Automated Distributed Threats (Oct. 2017).
Srinivasan, Kaushik et al.; Manufacturer Usage Description Specification Implementation [Viewed Dec. 2017] Can be seen at https://s3.eu-west-1.amazonaws.com/pfigshare-u-files/9634246/Muds.pdf.

* cited by examiner

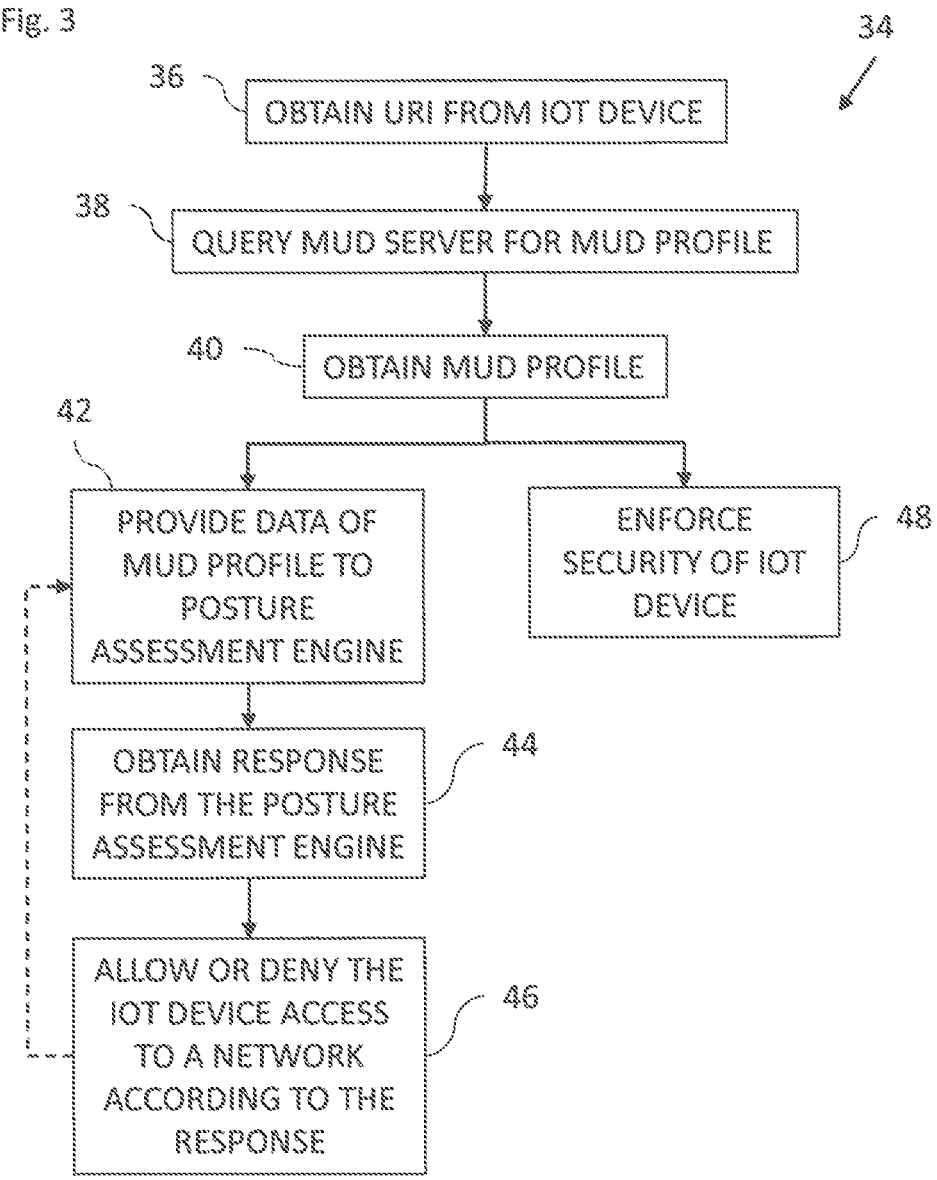

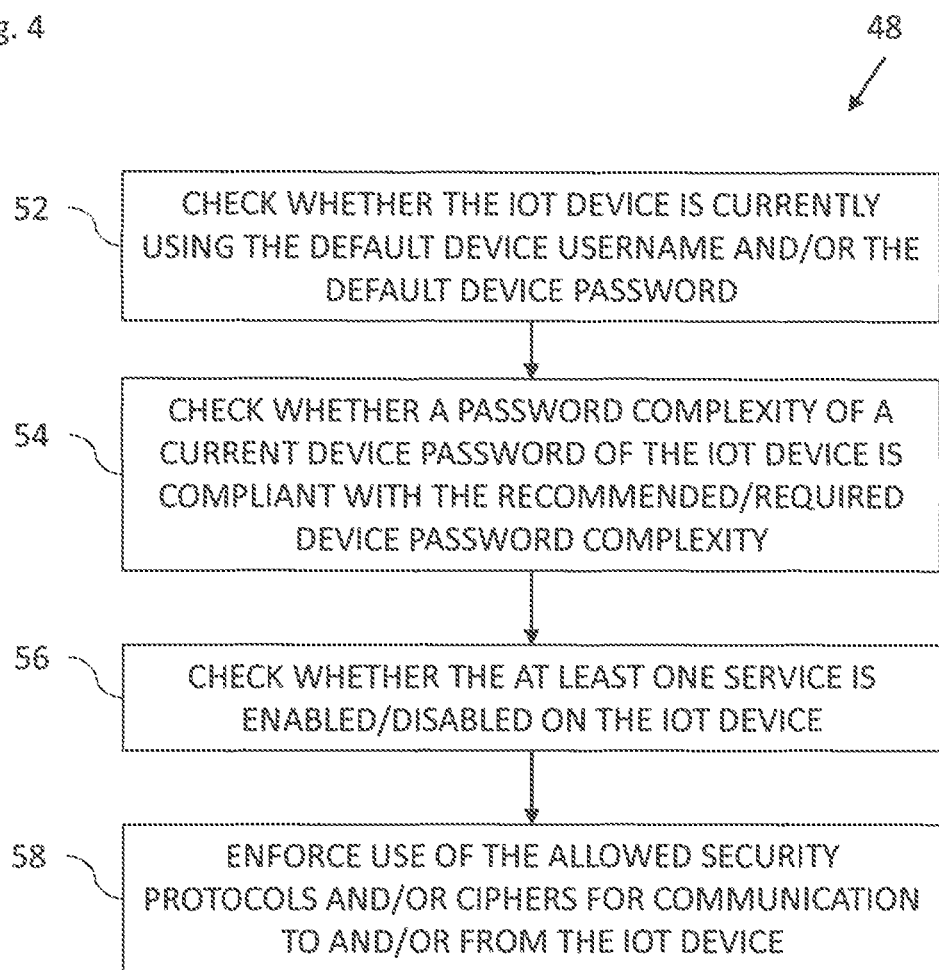

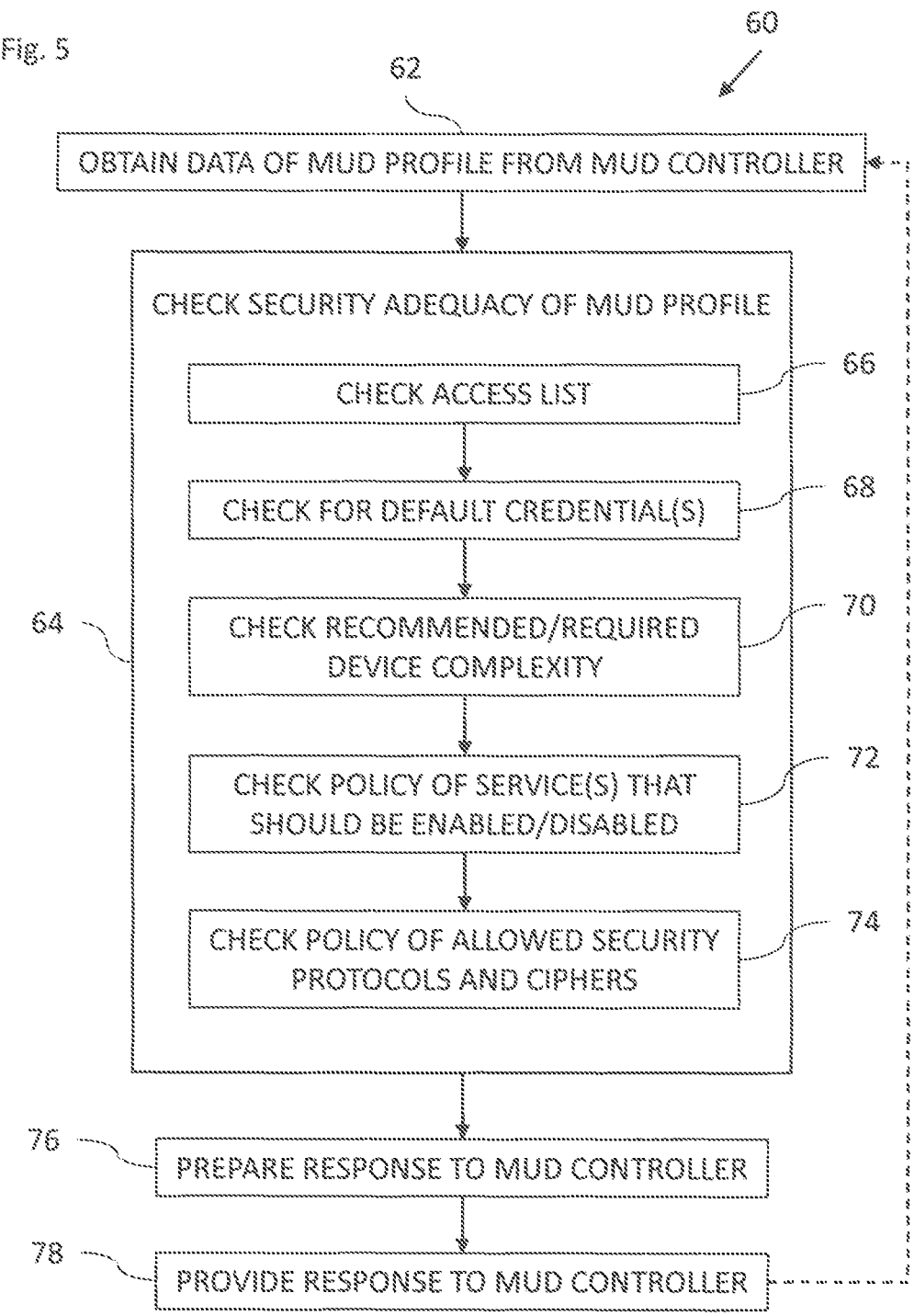

INTERNET OF THINGS SECURITY SYSTEM

TECHNICAL FIELD

The present disclosure generally relates to Internet of Things (IoT) security.

BACKGROUND

Recently, the world was introduced to the very first IoT malware, which is a strain of malware that can infect connected devices such as digital video recorders (DVRs), security cameras and more. In the attack, botnets or "bots" coordinated armies of compromised devices that sent massive amounts of malicious network traffic (terabits-per-second) to their targets in order to facilitate a distributed denial of service (DDoS) attack. The botnets were controlled by "Mirai", a self-spreading malware for IoT devices. This attack ended up flooding one of the largest website domain name system (DNS) hosting companies in the world, bringing a slew of major, well-known websites and services to a halt for days.

The manufacturer usage description (MUD) specification of the Internet Engineering Task Force (IETF), defined by request for comments (RFC) draft draft-ietf-opsawg-mud-13, attempts to prevent inappropriate communications by IoT devices, to prevent lateral movement by attackers across different device types, and to reduce complications of scale for network and security administrators. The MUD approach is different from existing cybersecurity approaches because it uses the subject matter expertise of device manufacturers, network security vendors, and network administrators to minimize the effort of securing IoT endpoints.

BRIEF DESCRIPTION OF THE DRAWINGS

The present disclosure will be understood and appreciated more fully from the following detailed description, taken in conjunction with the drawings in which:

FIG. 2 is a flowchart including exemplary steps in a method of operation of a MUD server for use in the system of FIG. 1;

FIGS. 3 and 4 are flowcharts including exemplary steps in a method of operation of a MUD controller for use in the system of FIG. 1; and FIG. 5 is a flowchart including exemplary steps in a method of operation of a posture assessment engine for use in the system of FIG. 1.

DESCRIPTION OF EXAMPLE EMBODIMENTS

Overview

Figure 1:
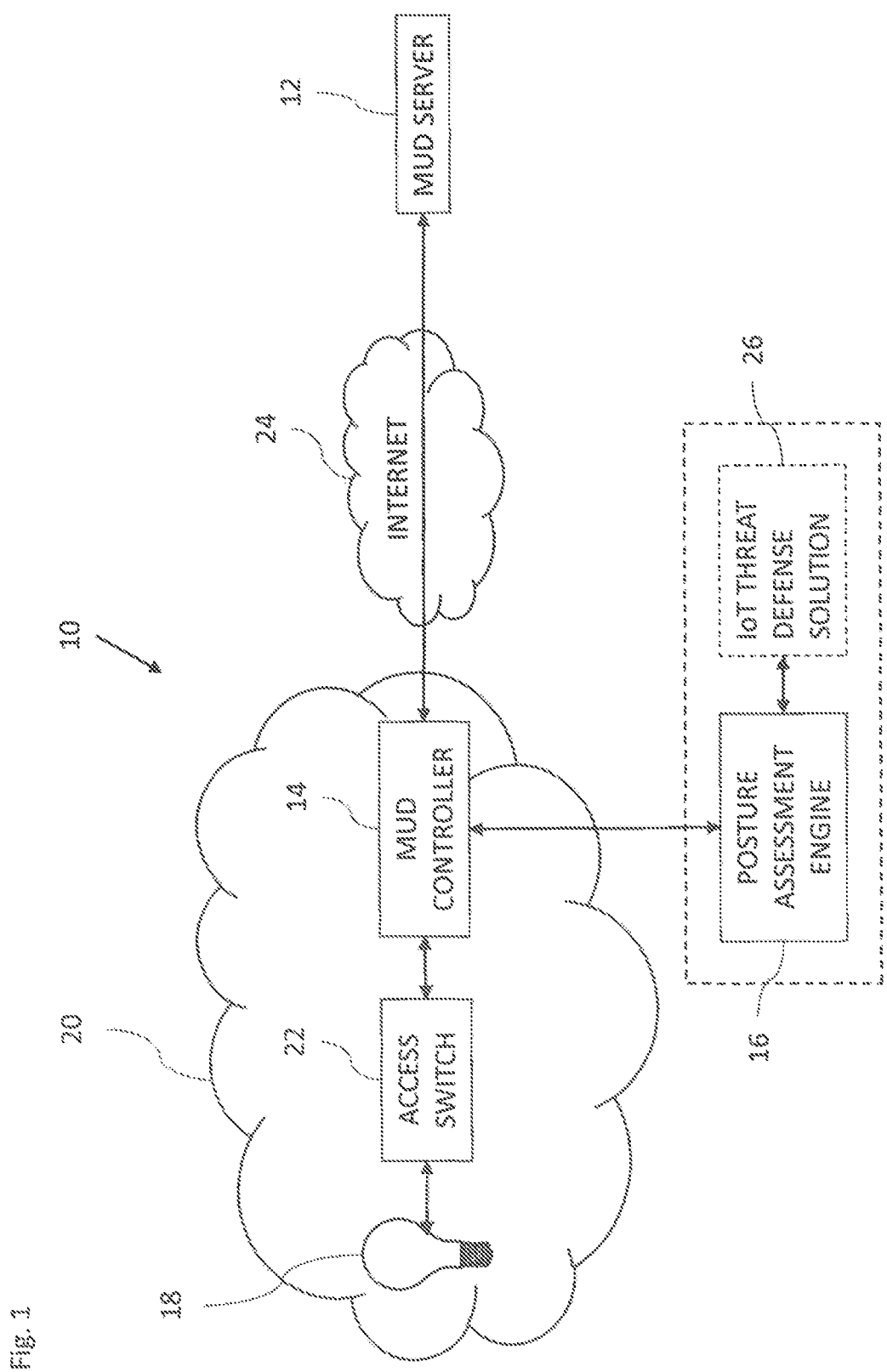
FIG. 1 is a partly pictorial, partly block diagram view of an Internet of Things (IoT) device security system constructed and operative in accordance with an embodiment of the present disclosure.

There is provided in accordance with an embodiment of the present disclosure, a device including a processor and a memory to store data used by the processor, wherein the processor is operative to run a manufacturer usage description (MUD) controller operative to obtain a MUD profile of an Internet of Things (IoT) device from a MUD server, the MUD profile of the IoT device including access rights of the IoT device, and any one or more of the following a default device username and/or a default device password of the IoT device, a recommended/required device password complexity of the IoT device, at least one service that should be enabled/disabled on the IoT device, and/or allowed security protocols and/or ciphers for communication to and/or from the IoT device, and enforce security of the IoT device the MUD profile of the IoT device.

There is also provided in accordance with another embodiment of the present disclosure, a device including a processor and a memory to store data used by the processor, wherein the processor is operative to run a posture assessment engine operative to obtain data based on a manufacturer usage description (MUD) profile of an Internet of Things (IoT) device from a MUD controller which enforces the security of the IoT device the MUD profile of the IoT device, check a security adequacy of the MUD profile, and provide a response to the MUD controller indicating whether, or not, the MUD profile provides adequate security for the IoT device.

There is also provided in accordance with still another embodiment of the present disclosure, a method, including generating a manufacturer usage description (MUD) profile including access rights of an Internet of Things (IoT) device, and any one or more of the following a default device username and/or a default device password of the IoT device, a recommended/required device password complexity of the IoT device, at least one service that should be enabled/disabled on the IoT device, and/or allowed security protocols and/or ciphers for communication to and/or from the IoT device, and storing the MUD profile in a memory.

Detailed Description

Reference is now made to FIG. 1, which is a partly pictorial, partly block diagram view of an Internet of Things (IoT) device security system 10 constructed and operative in accordance with an embodiment of the present disclosure. The security system 10 includes a manufacturer usage description (MUD) server 12, a MUD controller 14, and a posture assessment engine (PAE) 16.

By way of introduction, many IoT devices are known to be insecure. Consequently, they are often hacked and employed in distributed denial of service (DDoS) attacks and other malicious activities. The security system 10 mitigates the threat of insecure IoT devices and prevents the damage that the IoT devices may cause as will be described in more detail below.

FIG. 1 shows an IoT device 18 in a network 20. In FIG. 1, the IoT device 18 is shown as a light bulb. It will be appreciated that the IoT device 18 may be any suitable IoT device. The IoT device 18 is operationally connected to an access switch 22. The MUD controller 14 is disposed in the network 20. The MUD controller 14 may be disposed in any suitable device, for example, but not limited to, the access switch 22, the IoT device 18, another IoT device in the network 20, or in any other suitable device.

A manufacturer of the IoT device 18 generates a MUD profile for the IoT device 18. In accordance with the security system 10, the MUD profile is generated by the manufacturer to include additional security related data including any one or more of the following: default credentials; password complexity; enabled/disabled services; and/or allowed security protocol and ciphers. The MUD profile is stored in a memory in the MUD server 12. Generation of the MUD profile is described in more detail with reference to FIG. 2.

Based on a Uniform Resource Identifier (URI) (e.g., Uniform Resource Locator (URL)) emitted by the IoT device 18, for example, via the access switch 22, the MUD controller 14 queries the MUD server 12 via a network 24, for example, but not limited to, the Internet. The MUD profile is obtained by the MUD controller 14 from the MUD server 12. The MUD controller 14 enforces security of the IoT device 18 according to the MUD profile of the IoT device 18. Enforcement of the MUD profile by the MUD controller 14 is described in more detail with reference to FIGS. 3 and 4. In some embodiments of the present disclosure the network 20 and the network 24, may be the same network.

The security adequacy of the retrieved MUD profile may be checked by the posture assessment engine 16 upon receipt of the MUD profile by the MUD controller 14 from the MUD server 12 or any suitable time thereafter. The MUD profile may be periodically checked by the posture assessment engine 16 to ensure continued security adequacy of the retrieved MUD profile. The posture assessment engine 16 may be operative to check one or more MUD profiles of different IoT devices (not shown) either disposed in the network 20, or in one, or more, other networks. The posture assessment engine 16 may be disposed in the network 20 in any other suitable network, e.g., in the cloud. The posture assessment engine 16 may be operationally connected to, or implemented in, an IoT threat defense solution 26, for example, but not limited to the Cisco IoT Threat Defense solution of Cisco®. Components of the IoT threat defense solution 26 may provide information to the posture assessment engine 16 for use in checking the MUD profile. The posture assessment engine 16 is described in more detail with reference to FIG. 5.

It will be appreciated by those ordinarily skilled in the art that a MUD profile is described by way of example only, and that the security system 10 may be implemented using any suitable IoT device security profile, which may include the additional security related data described herein. It will be appreciated by those ordinarily skilled in the art that the MUD server 12 is described by way of example only, and that the MUD server 12 may be replaced by any suitable device for storing MUD profiles or other IoT device security profiles. It will be appreciated by those ordinarily skilled in the art that the MUD controller 14 is described by way of example only, and that the MUD controller 14 may be replaced by any suitable controller for enforcing security of IoT devices according to a MUD profile and/or any suitable IoT device security profile(s).

Reference is now made to FIG. 2, which is a flowchart 28 including exemplary steps in a method of operation of the MUD server 12 for use in the system 10 of FIG. 1. Reference is also made to FIG. 1. The MUD specification of the Internet Engineering Task Force (IETF), defined by request for comments (RFC) draft draft-ietf-opsawg-mud-13, enables the IoT networks to obtain and enforce specific manufacturer recommendations (in the form of a MUD profile) for securing IoT devices. The MUD profile according to the RFC sets the security policies for what the IoT device can access and also mitigates potential security attacks from and towards the IoT device. In order to improve security of IoT devices and take security to an even higher level, the security system 10 extends the MUD profile over and above that defined in the RFC to allow extended capabilities of security device profiling that go beyond Open Systems Interconnection (OSI) model layers 3 and 4.

The improved MUD profile of the security system 10 may include one or more extensions to the MUD profile of the above referenced RFC draft in order to provide improved IoT device security. The extensions are now described in more detail.

Default credentials such as a default username and/or a default password of the IoT device 18 may be included in the MUD profile so that the MUD controller 14 may check whether the default username and/or default password are still in use by the IoT device 18. It will be appreciated that use of a default username and/or default password provides easy access for an attacker to the IoT device 18. The IoT device 18 may be denied access to the network 20 (and/or other network) by the MUD controller 14 if the default username and/or password are in use. Being denied access to the network 20 or other network typically includes being denied access to and from devices in the network 20 and outside of the network 20.

Recommended/required device password complexity may be included in the MUD profile so that the MUD controller 14 may check whether the password being used by the IoT device 18 complies with the recommended or required password complexity. The IoT device 18 may be denied access to the network 20 and/or other network(s) by the MUD controller 14 if the password being used does not meet this password complexity.

One or more services for example, but not limited to, Hypertext Transfer Protocol (HTTP), Secure Shell (SSH), and/or Hypertext Transfer Protocol Secure (HTTPS), which should be enabled on the IoT device 18 may be included in the MUD profile. Additionally, or alternatively, one or more services for example, but not limited to, Telnet, which should be disabled on the IoT device 18, may be included in the MUD profile. The MUD controller 14 may then check whether the IoT device 18 has enabled and/or disabled the service(s) according to the MUD profile. The IoT device 18 may be denied access to the network 20 and/or other network(s) by the MUD controller 14 if the service(s) that should be enabled is(are) not enabled, and/or if the service(s) that should be disabled is(are) enabled.

Security protocol(s) and cryptographic cipher(s) allowed to communicate to, and from, the IoT device 18 may be included in the MUD profile. The MUD controller 14 may then enforce use of the security protocol(s) and cipher(s) for communication to, and from, the IoT device 18. The IoT device 18 may be denied access to the network 20 and/or other network(s) by the MUD controller 14 if the communication of the IoT device 18 is not according to the security profile(s) and/or cryptographic cipher(s) included in the MUD profile.

One example of a MUD profile extension that describes additional security related services is shown below (tree view of YANG model):

```
module: ietf-mud-advanced-security-services
  augment /ietf-mud:mud:
    +--rw additional-security-services-enabled? boolean
    +--rw default_credentials* [name]
    |  +--rw name              string
    |  +--rw default_password?  string
    +--rw password_strength?           string
    +--rw default_services* [service_name]
    |  +--rw service_name string
    |  +--rw service_protocol? string
    |  +--rw service_port?     string
    +--rw secure_protocol_strength* [service_name]
       +--rw service_name        string
       +--rw secure_protocol_string? string
       +--rw secure_cipher_string?   string
```

In accordance with the above, a processor (not shown) of the MUD server 12 may be operative to generate (block 30) a MUD profile including: access rights of an Internet of Things (IoT) device; and any one or more of the following as part of the MUD profile extension: a default device username and/or a default device password of the IoT device 18; a recommended/required device password complexity of the IoT device 18; at least one service that should be enabled/disabled on the IoT device 18; and/or allowed security protocols and/or ciphers for communication to and/or from the IoT device 18. The processor of the MUD server 12 may also be operative to store (block 32) the generated MUD profile in a memory of the MUD server 12 for future retrieval by the MUD controller 14 of the IoT device 18 or by any other MUD controller of another IoT device similar to the IoT device 18.

Reference is made to FIG. 3, which is a flowchart 34 including exemplary steps in a method of operation of the MUD controller 14 for use in the system 10 of FIG. 1. Reference is also made to FIG. 1. The MUD controller 14 may be implemented on a device (for example, on the access switch 22, the IoT device 18, another IoT device or any other suitable device, which may operate as a stand-alone MUD controller), which includes a processor and a memory to store data used by the processor. The processor of the device is operative to run the MUD controller 14.

The MUD controller 14 is operative to obtain (block 36) a URI (or any suitable identifier) which may be emitted by the IoT device 18. Based on the URI (or any suitable identifier), the MUD controller 14 is operative to query (block 38) the MUD server 12 for the MUD profile of the IoT device 18. The MUD controller 14 is operative to obtain (block 40) the MUD profile of the IoT device 18 from the MUD server 12. The MUD profile may be used by multiple devices of the same model, range, or type. The MUD profile of the IoT device 18 may include access rights of the IoT device 18 and any one or more of the following: a default device username and/or a default device password of the IoT device 18; a recommended/required device password complexity of the IoT device 18; at least one service that should be enabled/disabled on the IoT device 18; and/or allowed security protocols and/or ciphers for communication to, and/or from, the IoT device 18. The MUD controller 14 may merge the data from the MUD profile of the IoT device 18, automatically or upon approval from a network administrator, into an existing security profile.

The MUD controller 14 is operative to optionally parse the MUD profile for security-related attributes yielding parsed data. The MUD controller 14 is operative to transfer (block 42) the MUD profile, and/or the parsed data, and/or data based on the MUD profile, to the posture assessment engine 16 to check a security adequacy of the MUD profile. The MUD controller 14 may transfer the MUD profile, and/or the parsed data, and/or data based on the MUD profile, to the posture assessment engine 16 based on an internal decision of the MUD controller 14 or based on a request from the posture assessment engine 16. Checking the security adequacy of the MUD profile is described in more detail with reference to FIG. 5. The MUD controller 14 is operative to obtain (block 44) a response from the posture assessment engine 16. The response may indicate whether the MUD profile has security adequacy or not, and/or whether the IoT device 18 should be allowed or denied access to the network 20 (and/or any other network) based on the check. The MUD controller 14 is operative to allow or deny (block 46) the IoT device access to the network 20 (and/or any other network) according to the response obtained from the posture assessment engine 16. The steps of blocks 42-46 may be performed on receipt, or thereafter, of the MUD profile by the MUD controller 14 from the MUD server 12. The steps of blocks 42-46 may be repeated periodically or when a security risk relevant to the IoT device 18 is detected by the posture assessment engine 16.

The MUD controller 14 is operative to enforce security (block 48) of the IoT device 18 according to the MUD profile of the IoT device 18. The step of block 48 is described in more detail with reference to FIG. 4.

Reference is made to FIG. 4, which is a flowchart including exemplary sub-steps of the step of block 48 for use in the system 10 of FIG. 1. Reference is also made to FIG. 1. The step of block 48 is now described with reference to sub-steps of blocks 52-58. The sub-steps of blocks 52-58 may be performed by the MUD controller 14 in any suitable order and one or more of the sub-steps may be performed simultaneously. One or more of the sub-steps may also be omitted from the step of block 48.

The MUD controller 14 is operative to check (block 52) whether the IoT device 18 is currently using the default device username (included in the MUD profile) and/or the default device password (included in the MUD profile). The IoT device 18 may be denied access to the network 20, and/or other network, by the MUD controller 14 if the default username and/or password are in use.

The MUD controller 14 is operative to check (block 54) whether a password complexity of a current device password of the IoT device 18 is compliant with the recommended/required device password complexity (included in the MUD profile). The IoT device 18 may be denied access to the network 20, and/or other network, by the MUD controller 14 if the password does not meet this password complexity. In accordance with an alternative embodiment of the present disclosure, the MUD controller 14 may control the password creation process so that only passwords meeting the recommended/required device password complexity may be selected.

The MUD controller 14 is operative to check (block 56) whether the service(s) (included in the MUD profile) that should be enabled and/or disabled on the IoT device 18 is/are enabled or disabled on the IoT device 18. The IoT device 18 may be denied access to the network 20, and/or other network, by the MUD controller 14 if the service(s) that should be enabled is(are) not enabled and/or if the service(s) that should be disabled is(are) enabled on the IoT device 18.

The MUD controller 14 is operative to enforce use (block 58) of the allowed security protocols and/or ciphers (included in the MUD profile) for communication to, and/or from, the IoT device. The IoT device 18 may be denied access to the network 20, and/or other network, by the MUD controller 14 if the communication of the IoT device 18 is not according to the security profile(s) and/or cryptographic cipher(s) included in the MUD profile.

Reference is now made to FIG. 5, which is a flowchart 60 including exemplary steps in a method of operation of the posture assessment engine 16 for use in the system of FIG. 1. Reference is also made to FIG. 1. Security risks for an IoT device generally change over time. It would be desirable for the manufacturer of the IoT device 18 to update the MUD profile of the IoT device 18 to reflect new security risks and ensure that the MUD controller 14 is in possession of the updated MUD profile. Another, or additional, way to consider new security risks is for the posture assessment engine 16 to evaluate the MUD profile for security adequacy periodically and/or when security risks relevant to the IoT device 18 are discovered by the posture assessment engine 16.

The posture assessment engine 16 may be implemented on a device including a processor (not shown) and a memory (not shown) to store data used by the processor. The processor is operative to run the posture assessment engine 16.

As mentioned above with reference to FIG. 3, the MUD profile obtained from the MUD server 12 by the MUD controller 14 is parsed or processed to extract the security-related attributes from the MUD profile. The posture assessment engine 16 is operative to obtain (block 62) data (the parsed data of the MUD profile and/or the MUD profile and/or data based on the MUD profile) from the MUD controller 14, which enforces the security of the IoT device 18 according to the MUD profile of the IoT device 18.

The posture assessment engine 16 is operative to check (block 64) security adequacy of the MUD profile. The step of block 64 is now described in more detail with reference to sub-steps of blocks 66-74.

The posture assessment engine 16 may be operative to focus the check of the security adequacy of the MUD profile according to any one or more of the following: a device type of the IoT device 18; a vendor type of the IoT device 18; a model of the IoT device 18; and/or a vendor of the IoT device 18. It will be appreciated that security risks may vary according to the device and/or vendor type, and/or the model, and/or the vendor. The device type of the IoT device 18; the vendor type of the IoT device 18; the model of the IoT device 18; and/or the vendor of the IoT device 18 may be determined from the MUD profile and/or external data sources such as manufacturer websites.

The posture assessment engine 16 may be operative to use machine learning (e.g., artificial intelligence (AI) based machine learning algorithms) to determine which security adequacy checks to perform based on information learned from any one or more of the following: an Internet source (by combing the Internet for relevant risks); a threat intelligence report; and/or an IoT threat defense solution. The artificial intelligence (AI) based machine learning may include continuously analyzing and assessing security data points, building adaptive models per vendor or device, and orchestrating security policies for each IoT device that is managed by the MUD controller 14 or MUD controllers serviced by the posture assessment engine 16.

Checking the MUD profile for security adequacy may include checking that insecure or security weak protocols (such as telnet instead of SSH, or HTTP instead of HTTPS, etc.) are not included in the MUD profile and that default credentials are included in the MUD profile especially where default passwords have been compromised and are publicly available.

For example, if the MUD profile includes either of the following two access lists that are intended to provide outbound access to a cloud service on Transmission Control Protocol (TCP) port 23 and TCP port 80, the posture assessment engine 16 may flag this as a security risk and provide a "deny" or "block" verdict for enforcement by the MUD controller 14.

The following is an example MUD profile, which includes TCP port 23. The example also includes annotations to explain how the posture assessment engine (PAE) 16 analyzes the MUD profile data:

```
<MUD Profile Snippet>
{
    "ietf-mud:meta-info": {
        "lastUpdate": "2017-12-27T15:10:24+02:00",
        "cacheValidity": 1440
    },
    "ietf-acl:access-lists": {
        "ietf-acl:access-list": [
            {
                "acl-name": "mud-53134-v10in",
                "acl-type": "ipv4-acl",
                "ietf-mud:packet-direction": "to-device",    <------- Indicative of Inbound Policy to the device
                "access-list-entries": {
                    "ace": [
                        {
                            "rule-name": "entout0-in",
                            "matches": {
                                "ietf-mud:controller": "urn:ietf:params:mud:tel",
                                "protocol": 6,                           <------- Indicative of use of TCP protocol
                                "source-port-range": {
                                    "lower-port": 23,                    <------- Indicative of use of port 23
                                    "upper-port": 23                     <------- PAE takes the previous context & correlates the data
                                                                         <------- PAE understands this means TCP port 23, i.e. Telnet
                                }
                            },
                            "actions": {
                                "permit": [
                                    null                                 <------- Value of "Null" in this context refers to allow/permit
                                ]                                        <------- Based on above, this is a security risk
                            }                                            <------- PAE asks the controller to block n/w access for device.
                        },
                        {
                            "rule-name": "entout1-in",
                            "matches": {
```

```
                    "ietf-mud:controller": "urn:ietf:params:mud:credentials",
                    "credentials": {
                            "username": "admin",              <--------- Indicative of use
of default username
                            "password": "password"            <----- Indicative of use of
default, weak or compromised password
                    }
            },
            "actions": {
                    "permit": [
                            null                      <------- This rule should be blocked
but is currently allowed!
                                                      <------- PAE will signal this as
security risk to the controller
                                                      <-- PAE will also provide deny
verdict to controller for enforcement
                    }
            }
```

It will be appreciated that the sub-steps of blocks 66-74 described below may be performed in any suitable order. Two or more of the sub-steps may be performed simultaneously and one or more of the sub-steps may not be performed. The posture assessment engine 16 is operative to check (block 66) a security adequacy of an access list included in the MUD profile. The posture assessment engine 16 is operative to check (block 68) whether the data of (or data based on) the MUD profile includes a default device username and/or a default device password of the IoT device 18. By way of example only, using a default username for a specific vendor may not necessarily be a security risk because the machine-learning algorithm of the posture assessment engine 16 may understand that using a default username in the addition to a default password is a security risk as the default credentials may be used to log into a device for DDoS attacks and therefore if the default username or default password are not included in the MUD profile, the MUD profile may be deemed to provide inadequate security. The posture assessment engine 16 is operative to check (blocks 70-74) a security adequacy of one or more policies in the MUD profile. The policies may include: a recommended/required device password complexity of the IoT device 18 (block 70); at least one service that should be enabled/disabled on the IoT device 18 (block 72); and/or allowed security protocols and/or ciphers for communication to and/or from the IoT device 18 (block 74).

The posture assessment engine 16 may decide that the MUD profile provides adequate security if all (or a sub-set of all) the above security adequacy checks of the steps of the blocks 66-74 indicate security adequacy. One or more of the security policies checked in the steps of blocks 66-74 may be given a higher weighting when determining whether the MUD profile provides adequate security. The posture assessment engine 16 is operative to prepare (block 76) a response for the MUD controller 14 indicating whether, or not, the MUD profile provides adequate security for the IoT device 18. The posture assessment engine 16 is operative to provide (block 78) the response to the MUD controller 14.

The posture assessment engine 16 is operative to re-perform (dotted line 80) the steps of blocks 62-78 including checking the security adequacy of the MUD profile periodically and/or when a security risk is identified which is relevant to the IoT device 18.

In practice, some or all of these functions may be combined in a single physical component or, alternatively, implemented using multiple physical components. These physical components may comprise hard-wired or programmable devices, or a combination of the two. In some embodiments, at least some of the functions of the processing circuitry may be carried out by a programmable processor under the control of suitable software. This software may be downloaded to a device in electronic form, over a network, for example. Alternatively or additionally, the software may be stored in tangible, non-transitory computer-readable storage media, such as optical, magnetic, or electronic memory.

It is appreciated that software components may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present disclosure.

It will be appreciated that various features of the disclosure which are, for clarity, described in the contexts of separate embodiments may also be provided in combination in a single embodiment. Conversely, various features of the disclosure which are, for brevity, described in the context of a single embodiment may also be provided separately or in any suitable sub-combination.

It will be appreciated by persons skilled in the art that the present disclosure is not limited by what has been particularly shown and described hereinabove. Rather the scope of the disclosure is defined by the appended claims and equivalents thereof.

What is claimed is:

1. A device comprising:
a processor; and
a memory to store data used by the processor,
wherein the processor is operative to run a manufacturer usage description (MUD) controller operative to:
obtain information from an Internet of Things (IoT) device;
based on the information, obtain a MUD profile of the IoT device from a MUD server, the MUD profile of the IoT device including: access rights of the IoT device, ciphers for communication to and or from the IoT device, and any one or more of the following:
a default device username and or a default device password of the IoT device;

a recommended or required device password complexity of the IoT device;

at least one service that should be enabled or disabled on the IoT device; and enforce security of the IoT device according to the MUD profile of the IoT device.

2. The device according to claim 1, wherein the MUD profile for the IoT device includes the default device username and or the default device password of the IoT device, and wherein the MUD controller is operative to check whether the IoT device is currently using the default device username and or the default device password.

3. The device according to claim 1, wherein the MUD profile for the IoT device includes the recommended or required device password complexity of the IoT device, and wherein the MUD controller is operative to check whether a password complexity of a current device password of the IoT device is compliant with the recommended or required device password complexity.

4. The device according to claim 1, wherein the MUD profile for the IoT device includes the at least one service that should be enabled or disabled on the IoT device, and wherein the MUD controller is operative to check whether the at least one service is enabled or disabled on the IoT device.

5. The device according to claim 1, wherein the MUD controller is operative to: transfer data based on the MUD profile to a posture assessment engine to check a security adequacy of the MUD profile; obtain a response from the posture assessment engine; and allow or deny the IoT device access to a network according to the response obtained from the posture assessment engine.

6. The device of claim 1, wherein the MUD controller is operative to enforce the security of the IoT device by checking whether the IoT device has enabled one or more of a Hypertext Transfer Protocol (HTTP) service, a Secure Shell (SHH) service, and or a Hypertext Transfer Protocol Secure (HTTPS) service according to the MUD profile.

7. The device of claim 1, wherein the MUD controller is operative to enforce the security of the IoT device by denying access by the IoT device to a network based on communication of the IoT device being not according to the ciphers in the MUD profile.

8. A device comprising:
a processor; and
a memory to store data used by the processor,
wherein the processor is operative to run a posture assessment engine operative to:
obtain data based on a manufacturer usage description (MUD) profile of an Internet of Things (IoT) device from a MUD controller which enforces a security of the IoT device according to the MUD profile of the IoT device, wherein the MUD controller obtains information from the IoT device and obtains the MUD profile for the IoT device based on the information, the MUD profile including ciphers for communication to and or from the IoT device;
check a security adequacy of the MUD profile including checking the security adequacy of a policy in the data based on the MUD profile, the policy including allowed security protocols and or the ciphers for communication to and or the from the IoT device; and
provide a response to the MUD controller indicating whether, or not, the MUD profile provides adequate security for the IoT device.

9. The device according to claim 8, wherein the posture assessment engine is operative to focus checking of the security adequacy of the MUD profile according to any one or more of the following: a device type of the IoT device; a vendor type of the IoT device; a model of the IoT device; and or a vendor of the IoT device.

10. The device according to claim 8, wherein the posture assessment engine is operative to check the security adequacy of an access list included in the MUD profile.

11. The device according to claim 8, wherein the posture assessment engine is operative to check whether the data based on the MUD profile includes a default device username and or a default device password of the IoT device.

12. The device according to claim 8, wherein the posture assessment engine is operative to check the security adequacy of the policy in the MUD profile, the policy including a recommended or required device password complexity of the IoT device.

13. The device according to claim 8, wherein the posture assessment engine is operative to check the security adequacy of the policy in the data based on the MUD profile, the policy including at least one service that should be enabled or disabled on the IoT device.

14. The device according to claim 8, wherein the posture assessment engine is operative to perform checking of the security adequacy of the MUD profile periodically and or when a security risk is identified which is relevant to the IoT device.

15. The device according to claim 8, wherein the posture assessment engine is operative to use machine learning to determine which security adequacy checks to perform based on information learned from any one or more of the following: an Internet source; a threat intelligence report; and or an IoT threat defense solution.

16. The device of claim 8, wherein the posture assessment engine is operative to enforce the security of the IoT device by denying access by the IoT device to a network based on communication of the IoT device being not according to the ciphers in the MUD profile.

17. A method comprising:
generating a manufacturer usage description (MUD) profile including: access rights of an Internet of Things (IoT) device and any one or more of the following:
a default device username and or a default device password of the IoT device;
a recommended or required device password complexity of the IoT device; and or
at least one service that should be enabled or disabled on the IoT device;
storing the MUD profile in a memory; and
providing, the MUD profile stored in the memory, wherein the MUD profile includes ciphers for communication to and or from the IoT device and is provided based on information obtained from the IoT device.

18. The method according to claim 17, wherein the generating includes generating the MUD profile to include the default device username and or the default device password of the IoT device.

19. The method according to claim 17, wherein the generating includes generating the MUD profile to include the recommended or required device password complexity of the IoT device.

20. The method according to claim 17, wherein the generating includes generating the MUD profile to include the at least one service that should be enabled or disabled on the IoT device.

* * * * *